United States Patent [19]

Nevels

[11] Patent Number: 5,128,002
[45] Date of Patent: Jul. 7, 1992

[54] METHOD FOR PROCESSING RESIDUAL BATHS FROM THE PHOTOGRAPHIC AND PHOTOCHEMICAL INDUSTRIES

[76] Inventor: Leonardus M. M. Nevels, Daalzicht 37, 6097 EK Heel, Netherlands

[21] Appl. No.: 592,917

[22] Filed: Oct. 1, 1990

[30] Foreign Application Priority Data

Oct. 6, 1989 [NL] Netherlands .................. 8902489

[51] Int. Cl.$^5$ .................. C01G 1/00; C25C 1/00
[52] U.S. Cl. .................. 204/105 R; 75/713; 423/23; 423/DIG. 20; 210/912
[58] Field of Search ........ 204/105 R; 75/713; 423/23, DIG. 20; 210/912

[56] References Cited

U.S. PATENT DOCUMENTS

| | | | |
|---|---|---|---|
| 3,836,987 | 9/1974 | Gibbons et al. ............ | 354/300 |
| 3,954,381 | 5/1976 | Marecaux .................. | 431/2 |
| 3,982,932 | 9/1976 | Korosi ...................... | 423/23 |
| 4,002,524 | 1/1977 | Damgaard-Iverson et al. ... | 159/4 B |
| 4,079,585 | 3/1978 | Helleur ..................... | 60/39.02 |
| 4,132,640 | 1/1979 | Filzmoser ................... | 210/68 |
| 4,294,812 | 10/1981 | Oler ........................ | 423/357 |
| 4,323,430 | 4/1982 | Glassman et al. ............ | 203/7 |
| 4,462,911 | 7/1984 | Samhaber ................... | 210/638 |

*Primary Examiner*—John Niebling
*Assistant Examiner*—David G. Ryser
*Attorney, Agent, or Firm*—Foley & Lardner

[57] ABSTRACT

A method for processing residual liquids comprising organic complexes of heavy metals, sulphur and nitrogen compounds and amongst others originating from fixing baths and the like of the photographic and photochemical industries, whereby the residual liquid is sprayed in at least one spraying chamber or area with addition of nitrates and calcium ions into a hot, oxidizing gas flow, in particular originating from industrial installations or combustion furnaces.

11 Claims, No Drawings

METHOD FOR PROCESSING RESIDUAL BATHS FROM THE PHOTOGRAPHIC AND PHOTOCHEMICAL INDUSTRIES

The invention relates to a method for processing residual liquids, comprising organic complexes of heavy metals, sulphur and nitrogen compounds, and originating from fixing-baths and the like from the photographic and photochemical industries.

Hitherto fixing-baths, bleach fixing-baths and others, for example silver containing baths, are desilvered via electrolysis, via ion exchange (iron filters) or by reaction with a sulfide solution. Thereby silver and possibly a number of other heavy metals, such as copper, chromium and nickel, are largely removed. The residual liquid is then discharged to the sewerage. Some residual baths are or were combusted a.o. by the A.V.R. with household refuse. This causes serious problems in connection with pollution of the environment in both instances. Fixing-baths in particular have a high chemical oxygen consumption (C.Z.V.), a high Kjeldal nitrogen content, and contain complex compounds of heavy metals. The C.Z.V.- value amounts to $\pm 80,000$ mg O/l, while the Kjeldal-value for nitrogen is $\pm 20,000$ mg N/l. On discharging to the sewerage the pollution value in inhabitant equivalents (i.e.) is given by the formula: i.e.$= Q/136$ (C.Z.V.$+4.57$ N). If 1000 l residual baths per 24 hours are discharged to the sewerage, this implies:

i.e.$= 1/136 \times (80,000 + 4.57 \times 20,000) = 1257$.

Thus 365 m$^3$ residual bath per annum imply a pollution of 1257 i.e., In contrast combustion of residual baths with household refuse causes serious problems of distribution of sulphurdioxide in the environment as a consequence of the high sulphur content.

It has been proposed to oxidize residual baths by means of hydrogen peroxide, chromic acid, potassium permanganate, chlorine bleaching liquid and the like, but such a process proceeds only partially and is moreover very expensive.

It is now the object of the present invention to provide a method for processing residual liquids, as described above, whereby the above mentioned disadvantages are avoided. The invention provides thereto in a method as described in the beginning, characterised in that the residual liquid is sprayed into a hot, oxidizing gas flow, in particular originating from industrial installations or combustion furnaces, in at least one spraying chamber or area with addition of nitrates and calcium ions.

In particular the residual liquid is thereby sprayed into the hot gas flow in such a manner, that the temperature of the total residual material plus additions increases to above 50° C. and locally to over 100° C. Preferably the pH of the residual liquid is in addition decreased to below 5, which may be done with acid or as a consequence of acidic components of the gas flow, as those are often present in industrial waste gasses. Under these conditions numerous reactions occur between hot gas and sprayed liquid, which cause that the various undesired components are removed from the residual liquid. Sulphur compounds, such as thiosulfate, are for example converted into insoluble calciumsulfate, that can be removed as precipitate, while the heavy metals, in particular under acidic conditions, are released from the organic complex compounds, and these latter are decomposed to discharge gasses, such as nitrogen, carbon dioxide, and vapour. The ions of the heavy metals can be precipitated as hydroxides from the discharging liquid by making the latter alkaline, while silver can be removed, for example. by addition of a chloride.

The discharge from the combustion chamber of residual liquid is efficiently recirculated and gain sprayed into the hot gas flow. Thereby the recirculation stream is passed each time through stages, wherein various components can be removed. Thus the recirculation stream may be subjected to electrolysis and cementation by means of iron, in order to separate the metals. In addition the cementation with iron provides the advantage, that the liquid is enriched with iron ions. By increasing the pH of the recirculation stream to more than 5, hydroxides of heavy metals can be precipitated, whereby preferably calcium hydroxide is added. The precipitates of the various steps can be removed in the usual manner, for example by sedimentation or filtration. In removing silver by means of a halogenide, this may be added to the residual liquid for example in the form of kitchen-salt or another soluble chloride. However it is also possible that the halogenide is added via the hot oxidizing gas flow. For in many instances halogenide will be present already in an industrial gas.

Now the invention will be further elucidated by means of the processing of residual baths of the fixing treatment in the photographic industry. Those residual paths contain various metal complexes, a.o. an ethylenedinitrilotetraacetate (E.D.T.A.) complexes of copper, iron, silver, chromium, and nickel. Calcium nitrate is added to such a residual liquid in order to have adequate nitrate and calcium ions present. A residual liquid processed in that manner is made to react with a hot oxidizing gas, originating for example from a combustion furnaces. This is done by spraying the residual liquid in the hot gas flow in such a manner, that the temperature of the total residual liquid plus additives will increase to over 50° C. and locally even over 100° C. In addition care is taken, that the pH of the residual liquid is less than 5, which may be done by acidifying or by the acidic components already present in the gas flow.

Thereby the residual liquid plus additives acts as if it were a gas washing medium, whereby under the oxidizing conditions a plurality of reactions occur.

Thus thiosulfate present in the residual liquid will be converted into insoluble calcium sulfate according to the reaction system:

$$S_2O_3^{--} + 2H^- \rightleftharpoons H_2S_2O_3 \rightleftharpoons H_2O + S\downarrow + SO_2\uparrow$$

$$SO_2 + \text{oxidizer} + (\text{kat.Cu}^{++}\text{Fe}^{+++}\text{Ag}^+ \text{enz.}) \rightarrow SO_3$$

$$SO_3 + H_2O \rightarrow 2H^+ + SO_4^{--}$$

$$SO_4^{--} + Ca^{++} \rightarrow CaSO_4\downarrow$$

The precipitated calcium sulfate can conveniently be removed.

Apart from calcium sulfate lead sulfate may precipitate as well according to the reaction $$SO_4 + Pb^{++} \rightarrow PbSO_4\downarrow .$$

The Pb$^{++}$-ions may thereby be derived from the hot gas used.

Ammonium ions present in the residual liquid or in the hot gas will react with the nitrate ions of the residual liquid according to

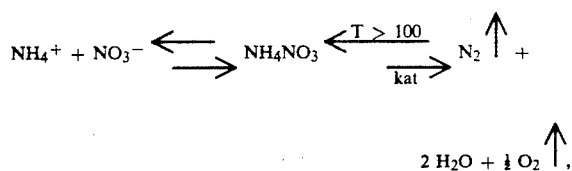

whereby the evolving oxygen may contribute to the further decomposition by oxidation of the complex compounds of the residual liquid.

Something similar happens with amines present, such as $R-NH_2$ and $R^1-NH-R_2$. By repeated contact of the gas washing liquid time and again with the hot gas flow this reaction occurs over and over again.

Organic compounds of the heavy metals, such as E.D.T.A.-complexes, are gradually oxidized by oxidizing substances, present in the gas flow. These reactions are catalytically promoted by released $Fe^{+++}$, $Cu^{++}$, $Hg^+$, $Ni^{++}$ en $Ag^+$.

As Fe-E.D.T.A. is by far the most stable complex, the relevant metals are released from other metal-E.D.T.A. complexes, also by the excess of $Fe^{+++}$. The latter is added, if required. Thereby E.D.T.A. is decomposed according to the following reaction scheme:

Metal complex with $eDTA = MeH_2 \cdot EDTA$ $MeH_2.EDTA \rightleftharpoons Me^{++} + H_2.EDTA$ $H_2.EDTA + Oxydizer + kat \rightarrow N_2 \uparrow + xCO_2 \uparrow + yH_2O$ The liquid discharging from the spraying (gas washing) area is efficiently brought at a pH higher than 5 by addition of calcium hydroxide. Hereby the heavy metals precipitate as hydroxides.

$Ag^+$ still present can be precipitated by addition of a chloride or a bromibe. The halogens may also be supplied via the gas flow, or are already present therein. Silver precipitates according to the reaction $Ag^+ + Cl^- \rightarrow AgCl \downarrow$.

During recycling the washing liquid is constantly freed of precipitate. From the residual liquid then disappear the sulphur compounds as precipitated sulphur, $CaSO_4$ and $PbSO_4$; the ammonium salts and amines disappear as $N_2$, $H_2O$ and oxygen. Finally the E.D.T.A. complexes and other organic compounds are completely oxidized to $CO_2$ and $H_2O$ and $N_2$. The residual liquid, eventually freed of detrimental components by continuous recirculation, can finally be 2discharged with the gas without further ado. The precipitated solid components may be collected for reuse, or be deposited in such a manner, that no damage can be caused to the environment.

EXAMPLE

A hot gas flow, originating from a combustion furnace, is contacted in a venturi-washing reactor with residual fixing washing liquid. The combustion gas was loaded with fly ash, wherein numbers of ten of heavy metal compounds, acidic gasses HBr, HCl, HF, $SO_2$, $NO_x$, and gasses such as $N_2$, $O_2$, CO and $CO_2$ were present. To the residual liquid, functioning as washing liquid, auxilliary substances were regularly added during the continuously proceding process, to wit Ajax and M.I.R..

Ajax is a mixture of $Ca(OH)_2$ and $Ca(NO_3)_2$.

M.I.R. is a mixture of $Cu(NH_3)^{++}$, $NH_4^+$, $NO_3^-$, $Cl^-$, $BF_4^-$, $CrO_4^{--}$, $SiFO^{--}$.

Of Ajax the contents of $Ca^{++}$ and $NO_3^-$ were determined.

Of M.I.R. the contents of $NH_4^+$ and $Cu^{++}$ were determined.

Of the residual fixing liquid the heavy metals, $NH_4^+$, $Ca^{++}$, $SO_4^{--}$, $Br^-$, $Cl^-$, and the dry matter content were determined.

During the process solid material was continuously deposited, consisting of a.o. $CaSO_4$, $PbSO_4$, $CaF_2$, AgBr, AgCl, $SiO_2$ and hydroxides of heavy metals.

At the beginning the reactor contained 12 m³ residual fixing liquids. At the end of the test period after 17 days the reactor contained 12 m³ gas washing liquid. In the intervening period 75 m³ residual fixing liquid, 1, 8 m³ M.I.R. and 15 m³ Ajax had been added.

The results of the experiment are given in the following table.

Analysis:
R.F.V. = residual fixing liquid (12 + 75 m³)
G.W.V. = gas washing liquid at the end (12 m³)
Ajax (15 m³)
M.I.R. (1.8 m³) =
decomposition = (R.F.V. + Ajax + M.I.R.) − G.W.V.

|  | kg/m³ R.F.V. | Total in 87 m³ in kg | Ajax | Total in 15 m³ in kg | kg/m³ M.I.R. | Total in 1.8 m³ in kg | kg/m³ G.W.V. | Total in 12 m³ in kg | Δ kg |
|---|---|---|---|---|---|---|---|---|---|
| Cu | 0.050 | 4.35 | | | 20.9 | 37.6 | 0.042 | 0.5 | 41.45 |
| Ni | 0.038 | 3.30 | | | | | 0.053 | 0.6 | 2.7 |
| Cr | 0.151 | 13.13 | | | | | 0.071 | 0.84 | 12.3 |
| Zn | 0.085 | 7.39 | | | | | 0.100 | 1.2 | 6.19 |
| Cd | 0.0016 | 0.14 | | | | | 0.0022 | 0.02 | 0.12 |
| Ag | 0.050 | 4.35 | | | | | 0.0005 | 0.006 | 4.34 |
| Fe | 3.8 | 330 | | | | | 4.2 | 50.4 | 279.6 |
| Pb | 0.305 | 26.5 | | | | | 0.035 | 0.4 | 26.1 |
| $NH_4^+$ | 27.1 | 2357.7 | | | 28.4 | 51.1 | 27.8 | 333.6 | 2075.2 |
| $SO_4^{11}$ | 128.0 | 11136 | | | | | 109 | 1308 | 9828 |
| $Br^1$ | 1.7 | 147.9 | | | | | 12 | 144 | 3.95 |
| $Cl^1$ | 0.7 | 60.9 | | | 31.37 | 56.46 | 9.3 | 111.6 | 4.97 |
| Ca | 3.3 | 287 | 40 | 600 | | | 9.5 | 114 | 773 |
| Dry matter | 256.8 | 22341 | | | 90 | | 267 | 3204 | 19137 |

| | | | | | | | |
|---|---|---|---|---|---|---|---|
| $NO_3^-$[1] | 18.5 | 1609.5 | 106 | 1590 | 0.5 | 6 | 3193.5 |
| C.Z.V. | 70.0 | 6090 | | | 55 | 660 | 5450 |

The following appears from the above table.

1) Substantially complete decomposition of complexes takes place, for heavy metals do not stay in solution. C.Z.V. value decreases considerably.

2) Substantially complete decomposition of $NH_4^+$ and $NO_3^-$ takes place.

3) Thiosulfate decomposes into sulphur and sulfate.

4) Substatially complete removal of halogens and silver is possible.

In the above the invention has been elucidated by means of an example, wherein residual fixing liquid from the photochemical industry was decomposed. However, it is also possible to decompose in a similar manner other residual liquids containing metal complexes, for example derived from the electronic and galvanic industries, C.Z.V.-waste baths of laboratories, ammoniacal baths, sulfamate containing waste baths, etc..

Though the method according to the invention has been elucidated in the above by means of am example, it will be obvious that variations and modifications are possible, all within the scope of the invention. These will be obvious to an expert after inspection of the above.

I claim:

1. A method for processing residual liquids comprising organic complexes of heavy metals, sulphur and nitrogen compounds originating from fixing baths of the photographic and photochemical industries, characterised in that the residual liquid is sprayed in at least one spraying chamber or area with addition or nitrates and calcium ions into an oxidizing gas flow, said gas flow exceeding 100° C. and originating from industrial installations producing waste gases or combustion furnaces.

2. A method according to claim 1, characterised in that the residual liquid is sprayed into the hot gas flow in such a manner, that the temperature of the sprayed liquid increases to over 50° C.

3. A method according to claim 1, characterised in that the residual liquid is acidified to the pH lower than 5.

4. A method according to claim 1, characterised in that an excess of $Fe^{+++}$-ions is added to the residual liquid.

5. A method according to claim 1, characterized in that the discharge of residual liquid from the spraying chamber or area is recirculated and is resprayed into the hot gas flow.

6. A method according to claim 5, characterised in that the contents of $Fe^{+++}$-ions in the recirculation stream is supplemented.

7. A method according to claim 5, characterised in that the recirculation stream is subjected to electrolysis and cementation by means of iron.

8. A method according to claim 5, characterised in that the pH of the recirculation stream is increased to more than 5 in order to precipitate hydroxides of heavy metals.

9. A method according to claim 8, characterised in that the pH of the recirculation stream is increased by addition of calcium hydroxide.

10. A method according to claim 1, characterised in that a halogenide is added to the residual liquid.

11. A method according to claim 10, characterised in that the halogenide is added by way of the hot, oxidizing gas flow.

* * * * *